(12) United States Patent
Hickey, II

(10) Patent No.: US 6,347,733 B1
(45) Date of Patent: Feb. 19, 2002

(54) WORKER PIECE POSITIONER FOR USE WITH INDUSTRIAL ROBOT

(76) Inventor: Edward J. Hickey, II, 2708 Linden Ave., Dayton, OH (US) 45410

( * ) Notice: Subject to any disclaimer, the term of this patent is extended or adjusted under 35 U.S.C. 154(b) by 0 days.

(21) Appl. No.: 09/542,927

(22) Filed: Apr. 4, 2000

(51) Int. Cl.[7] .............................................. B23K 26/12
(52) U.S. Cl. .............................. 228/49.1; 219/121.82; 219/121.86; 269/71
(58) Field of Search ..................... 219/121.82, 121.86; 228/49.1, 49.2, 47.1, 212, 213; 269/55, 43, 71; 29/38 A, 38 B; 409/165, 168, 219; 414/225.01, 738, 680

(56) References Cited

U.S. PATENT DOCUMENTS

| | | | |
|---|---|---|---|
| 4,049,182 A | * | 9/1977 | Louw et al. |
| 4,205,216 A | * | 5/1980 | Douglas |
| 5,643,477 A | * | 7/1997 | Gullo et al. |
| 5,658,476 A | * | 8/1997 | Gullo et al. |
| 6,147,320 A | * | 11/2000 | Bernecker et al. |
| 6,147,323 A | * | 11/2000 | Erickson et al. |

* cited by examiner

Primary Examiner—Tom Dunn
Assistant Examiner—Jonathan Johnson
(74) Attorney, Agent, or Firm—R. William Graham

(57) ABSTRACT

A workpiece positioner including a pair of generally vertical laterally displaced and opposing workpiece holder supports and a pair of workpiece holders. Each the pair of workpiece holders includes a first and second workpiece holder which are operably associated with one of the workpiece holder supports such that the opposing first workpiece holders are generally coaxially aligned and the second workpiece holders are generally coaxially aligned and the workpiece holders rotate about a first generally horizontal common axis with respect to the vertical workpiece holder supports, the first workpiece holders and the second workpiece holders, respectively, are disposed at least partially on an opposite side of a plane which runs generally perpendicular to the vertical workpiece holder support and through the horizontal common axis.

8 Claims, 5 Drawing Sheets

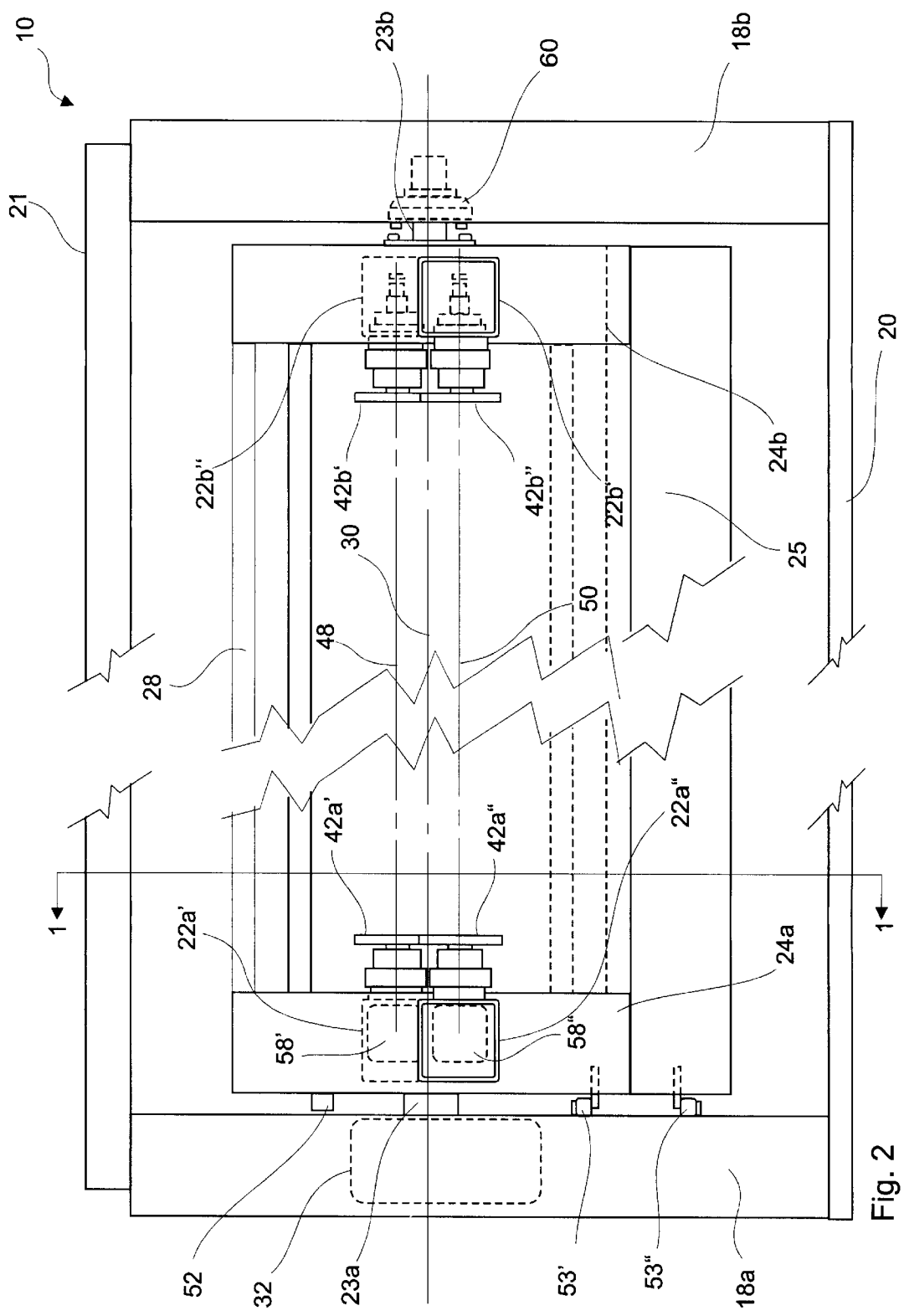

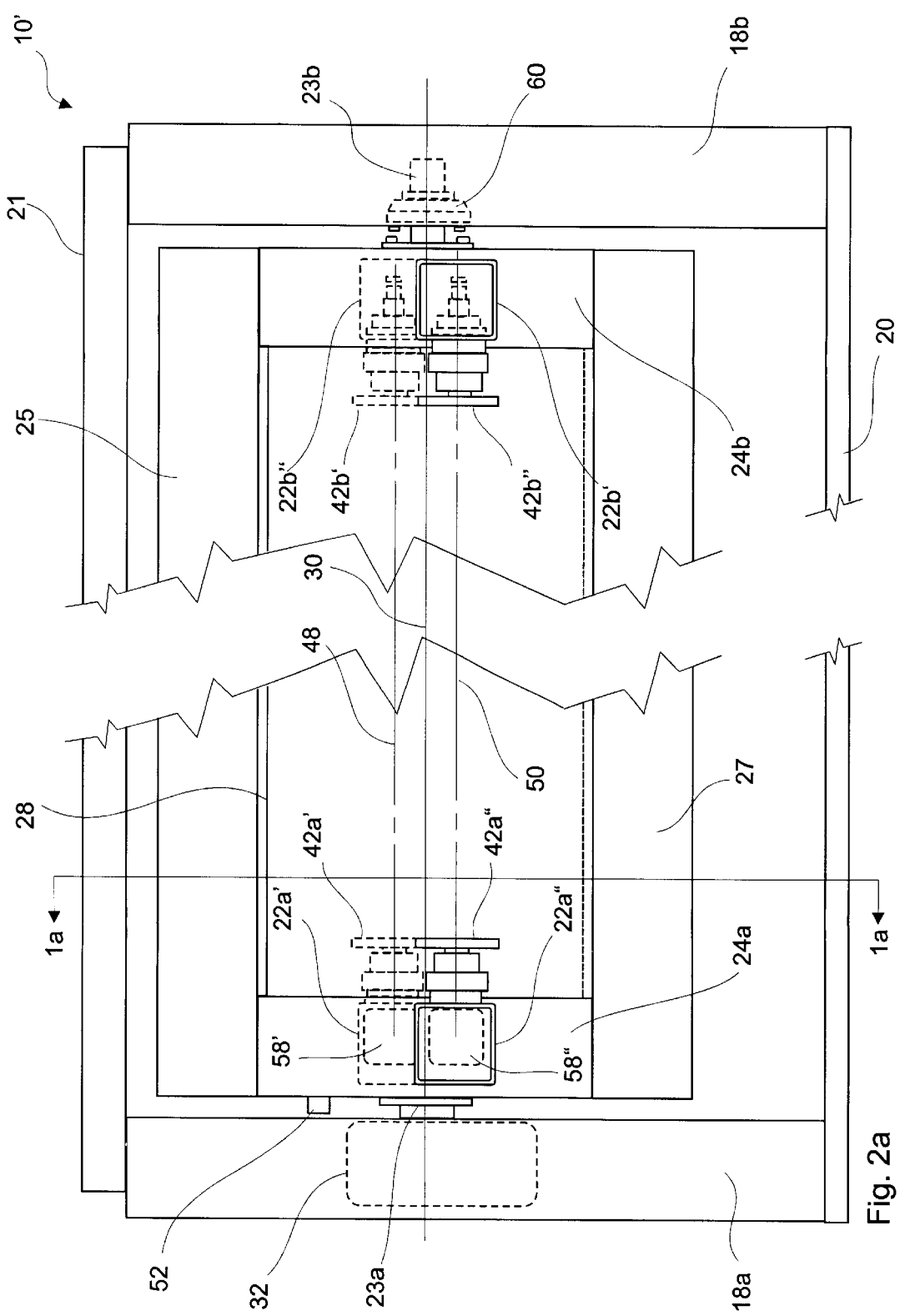

WORKER PIECE POSITIONER FOR USE WITH INDUSTRIAL ROBOT

BACKGROUND OF THE INVENTION

1. Field of Invention

This invention relates to a workpiece positioner for positioning a plurality of workpieces in an efficient enhanced manner relative to an industrial robot. More particularly, but not by way of limitation, the invention is directed to a workpiece positioner with enhanced workpiece diameter capacity relative to positioner size and also includes a shield component.

2. Related Art

Workpiece positioners for welding parts similar to those welded by the positioner of the present invention have existed for a number of years. H-type positioners, for example, have long existed and include two parallel workpiece holders with an independent drive for rotating the workpiece holders about one axis and another drive for rotating the workpiece about another axis which is defined between rotational connection points of opposing arms of the workpiece holders. Such type is disclosed in U.S. Pat. No. 4,666,363, wherein the workpiece holder moves the workpieces so that the robot does not need to be moved during its operation and may be utilized to an optimum extent. This type has certain drawbacks in its design, such as, it only has a capacity for handling relatively smaller diameter workpieces to avoid interfering with a central crossbeam of the H-type structure which in turn negatively effects the operator ergonomics and robot working height.

Another design, as shown in U.S. Pat. No. 5,873,569, employs a rectangular type configuration which omits the central cross-beam in order to increase diameter of the workpiece which can be handled. However, this design also has similar limitations to the H-type in that increased diameter size of workpiece typically results in the enlargement of the overall structure of the workpiece positioner, operator ergonomics and rearrangement of the robotics involved.

Heretofore, an increase in diameter size workpieces caused significant retooling and increased expense. Another problem generated from increasing the size of such workpiece positioners is that the tolerances required are more difficult to maintain.

Accordingly, the present invention is an improvement over the art with increased capacity for handling increased diameter workpieces without the need for enlarging the space required for the workpiece holder and associated robotics as well as substantially obviating the need for height adjusting aids for workers using such workpiece holders and robotics.

SUMMARY OF THE INVENTION

It is an object to improve workpiece positioners.

It is another object to improve safety in a work place which uses workpiece positioners and robotics.

It is still another object to increase capacity for handling increased diameter workpieces without the need for enlarging the space required for the workpiece positioner and associated robotics.

It still another object in the field of workpiece positioners to minimize the height requirement for associated robotic's programming and fixture maintenance and replacement.

It is another object to improve operator ergonomics in a work place which uses workpiece positioners and robotics.

Accordingly, the invention is directed to a workpiece positioner with the aforesaid objects in mind. The workpiece positioner includes a pair of generally vertically disposed laterally displaced and opposing workpiece holder supports and two pair of operably associated workpiece holders. Each pair of workpiece holders including a first and second workpiece holder which are operably associated with one of the workpiece holder supports such that the opposing first workpiece holders are generally coaxially aligned and the second workpiece holders are generally coaxially aligned. The workpiece holders rotate about a first generally horizontal common axis with respect to the vertical workpiece holder supports. Further, the first workpiece holders and the second workpiece holders, respectively, are disposed at least partially on an opposite side of a plane which runs generally perpendicular to the vertical workpiece holder support and through the horizontal common axis.

Preferably, the workpiece holders are interconnected by a support tying member, to form a U-Shaped or rectangle member, which is configured to provide a minimal clearance region between two workpieces operably disposed on the workpiece holders. The support tying member can be further characterized to extend through the minimal clearance region in a manner to serve as a shield between workpieces. There are further included holder drive means for selectively rotating the workpiece holder about the first horizontal common axis and workpiece drive means for selectively and independently rotating each workpiece about a second axis between the first workpiece holders and a third common axis between the second workpiece holders.

Other objects and advantages of the invention will be apparent from the following description, the accompanying drawings and the appended claims.

BRIEF DESCRIPTION OF THE DRAWINGS

FIG. 2 is a side view of the positioner of FIG. 1 with a central portion broken away;

FIG. 2a is a side view of the positioner of FIG. 1 with a central portion broken away;

DETAILED DESCRIPTION OF THE INVENTION

Figure 1:
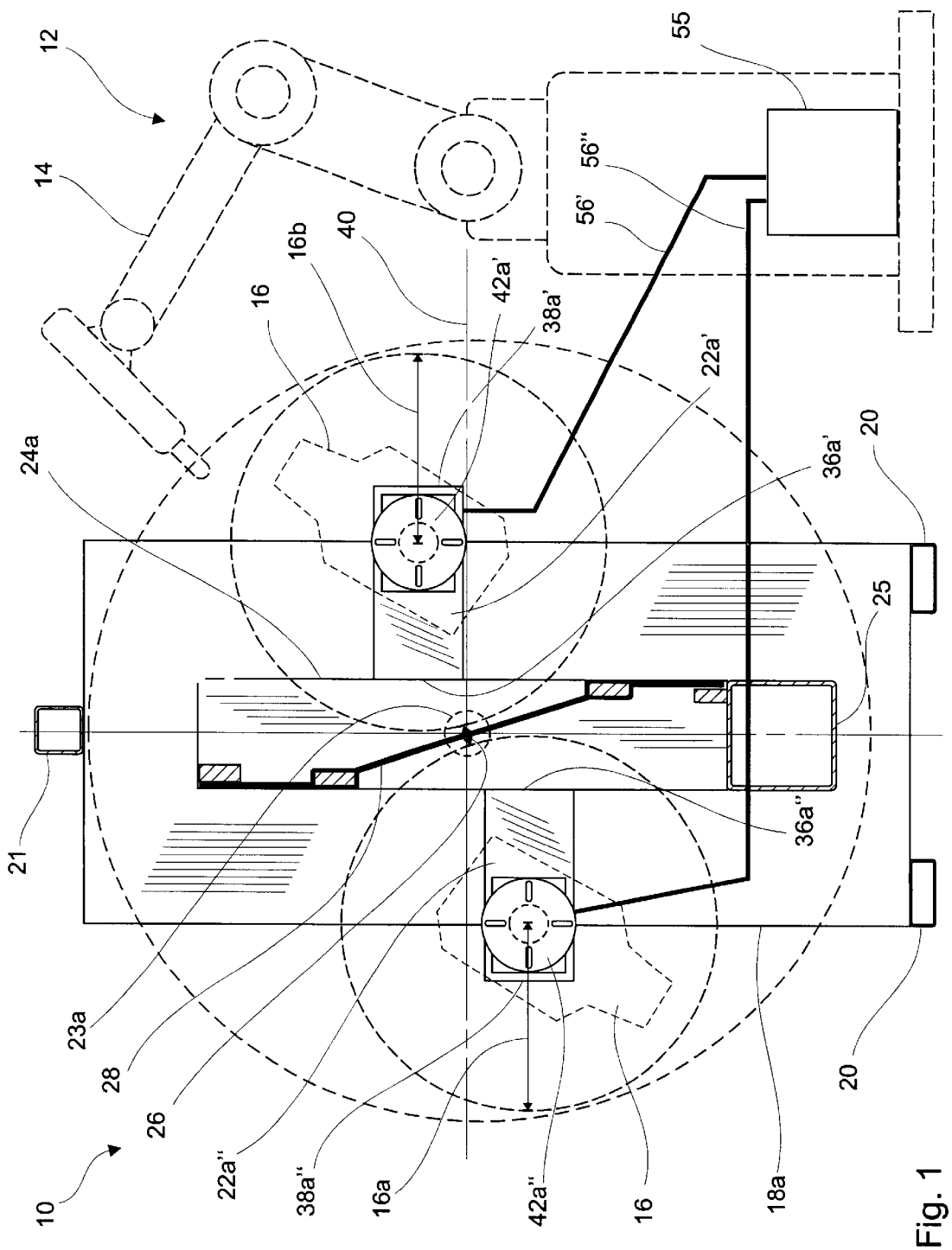
FIG. 1 is a sectional view through line 1—1 of FIG. 2 of a workpiece positioner with an associated industrial robot.

Referring now to the drawings, the workpiece positioner of the present invention is generally represented by the numerals 10 and 10' which cooperates with an industrial robot 12 which is operably disposed adjacent the workpiece positioner 10. The industrial robot 12 is of the type having an implement supporting arm 14 which may be positioned over a workpiece 16 supported by the workpiece positioner 10. The specificity of the industrial robot 12 can be of a type known to the art to operate according to a predetermined control program residing on a processor (not shown) to work the workpiece 16. The control program would also include control of the operation of the workpiece positioner 10.

The workpiece positioner 10 includes a pair of generally vertical laterally displaced and opposing workpiece holder supports 18a and 18b which are interconnected by base support beams 20 and an upper tie beam 21. The workpiece holder supports 18a and 18b are shown here as a rectangular hollow panel configuration, but can be of other configuration to carry out the invention. Central beam members 24a and 24b are rotatably connected to workpiece holder supports 18a and 18b, respectively, via shafts 23a and 23b, respectively. Two sets of workpiece holders 22a', 22a" and 22b', 22b" are connected to central beam members 24a and 24b, respectively, in an offset manner with workpiece holder 22a' and 22b' sharing a common central plane and with workpiece holder 22a" and 22b" sharing a common central plane. While the workpiece holders 22a', 22a" and 22b', 22b" are arranged in a particular manner as shown, it is contemplated that other arrangements will be apparent to those skilled in the art to carry out the spirit of the invention. Here, FIG. 1 depicts the workpiece holders 22a" and 22b" below a plane 40 or in a "loading position" where as the workpiece holders 22a' and 22b' are in a work position for the associated robot 12.

Figure 1A:
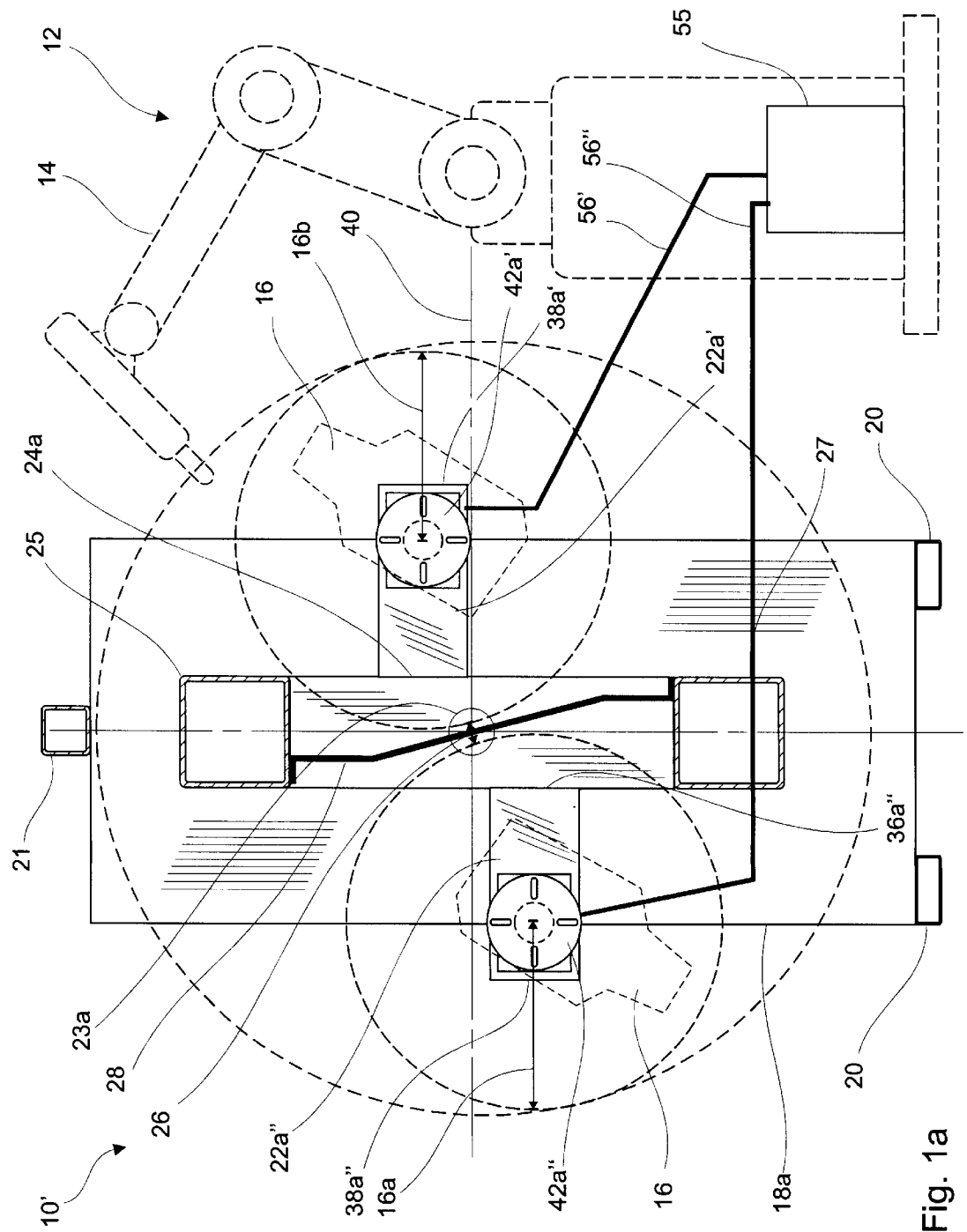
FIG. 1a is a sectional view through line 1a—1a of FIG. 2a of another workpiece positioner with an associated industrial robot.
Figure 3:
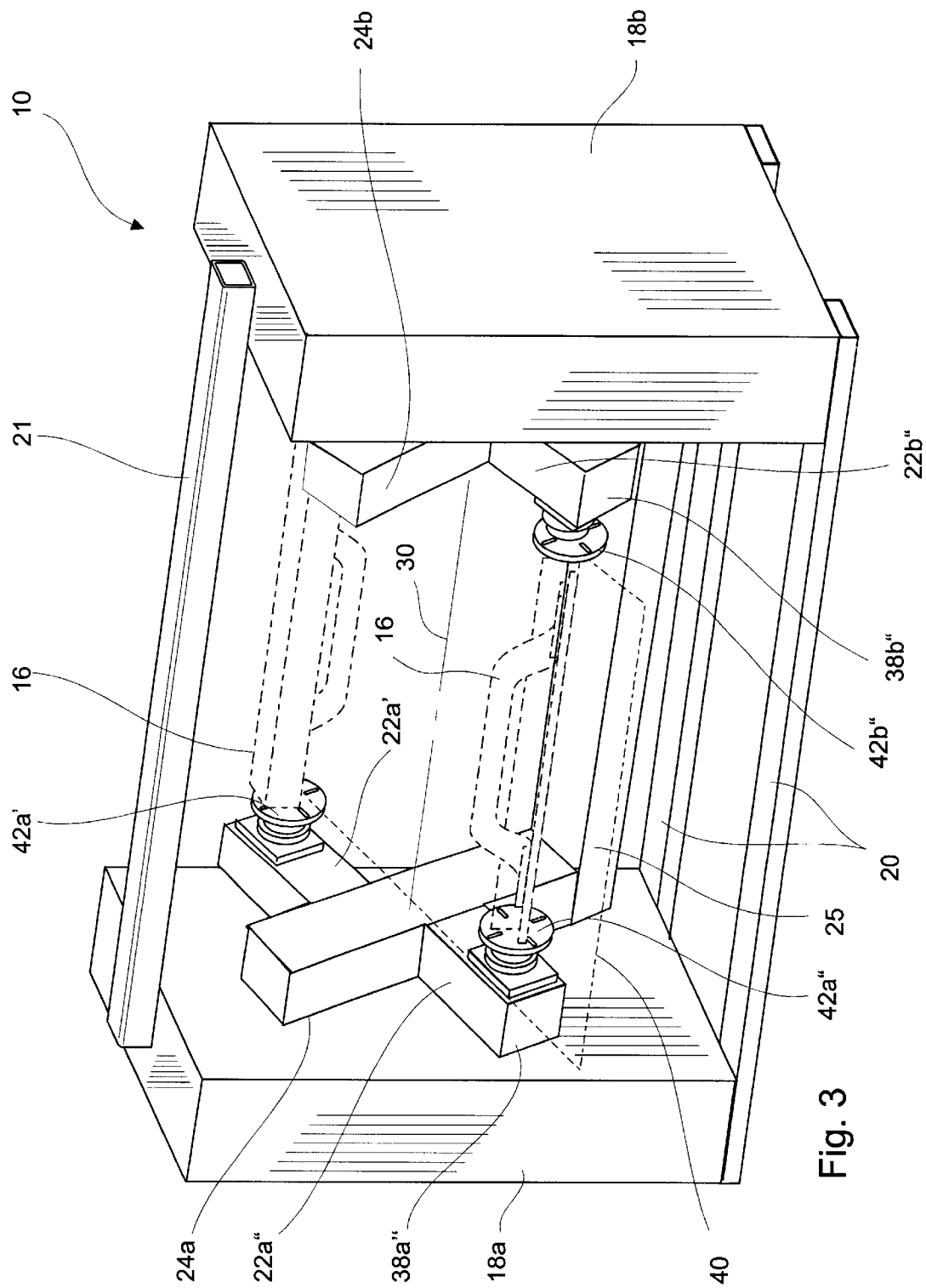
FIG. 3 is a perspective view of the embodiment of FIG. 1 in use.

A cross beam member 25 interconnects ends of the central beam members 24a and 24b. FIGS. 1a and 2a further include a cross beam member 27 interconnecting other ends of cross beam members 24a and 24b. In either case, the cross beam members are arranged to provide a minimal clearance region 26 between two workpiece radius regions 16a and 16b operably disposed on the workpiece holders 22a', 22b' and 22a", 22b", respectively.

A panel member 28 can be preferably included to interconnect between the cross beam members 25 and 27 and extends through minimal clearance region 26 in a manner to serve as a shield between workpieces radius regions 16a and 16b. The panel member 28 can be of a sheet metal construction which will lend further structural stability to the positioner 10' without significantly diminishing the radius regions 16a and 16b.

Each workpiece holder 22a', 22b' and 22a", 22b" is rotatable about a common horizontal axis 30 extending between the vertical central beam members 24a and 24b through shafts 23a and 23b. Rotation can be achieved in a variety of ways known to the art. For example, one shaft 23a can serve as a drive shaft which can extend from a drive mechanism 32 which can be operably disposed within the housing of the workpiece holder support 18a. This embodiment contemplates the drive shaft 23a operably connected to one of the central beam member 24a while central beam member 24b is rotatably connected to the workpiece holder support 18b via the shaft 23b being connected thereto and disposed in a complementary bearing surface of the workpiece holder support 18b.

Each of the workpiece holders 22a', 22a" and 22b', 22b" has an inner first end 36a', 36a" and 36b', 36b" respectively, connected to the central beams 24a and 24b, respectively. Further, each workpiece holder 22a', 22a" and 22b', 22b" has an outer end 38a', 38a" and 38b', 38b". A plane 40 is defined between the ends 38a', 38a" and 38b', 38b" which is generally perpendicular to the vertical central beam members 24a and 24b and runs through the horizontal common axis 30.

The workpiece holders 22a' and 22b' extend in a first common direction from the axis 30 and the workpiece holders 22a" and 22b" extend in a second common direction from the axis 30 which is generally parallel and offset to the first common direction. As seen in FIGS. 1 and 1a, there is created a loading position which is lower to ease the worker's burden of changing out the workpieces to be operated by the associated robot in a higher position. It is to be noted that the present invention provides for a configuration which provides overall a lower operating height for the robot 12 than heretofore.

Each of the first ends 22a' and 22b' have a first workpiece plate 42a' and 42b' which share a common axis 48 about which the workpiece rotates when held by the first workpiece plates 42a' and 42b'. Each of the second ends 22a" and 22b" have a second workpiece plate 42a" and 42b" which share a common axis 50 about which another workpiece rotates when held by the second workpiece plates 42a" and 42b".

On sides of the support 18a are clamps 52' and 52", respectively, which are adapted to cooperate with stops 54' and 54", respectively mounted on a side of the central beam member 24a facing the support 18a for limiting the rotational movement thereof.

The drive mechanism 32 can be a reversible electric motor and the operation of which in a suitable manner is co-ordinated with the operational program of the robot 12 serves to rotate the workpiece holders 22a and 22b about the axis 30 such that the clamps 52' and 52" are caused to alternatingly engage stops 54' and 54", respectively.

Each of the workpiece plates 42a' and 42a" can be rotatably driven by means known in the art. The plates 42a' and 42a" can engage a drive plate which is adapted to engage on a shaft of a turning motors 58' and 58", as known in the art. The rotational movements of which through electrical control system 55 are coordinated with the operational movements of the robot 12. The turning motors 58' and 58" are connected to control system 55 via lines 56' and 56", respectively.

The workpiece plates 42a' and 42a" and 42b' and 42b" are in a manner known to permit the attachment of suitable fixtures for retaining the workpieces or the parts to be included therein and to be, for example, welded together. Also, fixtures of the type known in the art can be used on the workpiece plates 42a' and 42b' and 42a" and 42b", respectively, may also be used for supporting individual workpieces.

The mode of operation of the workpiece positioner is as follows: After a new workpiece or parts of the same have been fastened between the plates 42" and 42b", the so-called loading position, the workpiece holder 22a" is by means of the drive mechanism 32, shaft 23a and support member 24a rotated half a revolution such that the workpiece 16 is moved to the so-called operative position within the operating range of the robot 12. Thereafter the turning motor is axially moved in a direction to engagingly drive the support plate 42a". At such time, the industrial robot 12 may carry out its operation in co-ordination with the turning motor which sees to it that desired portions of the workpiece become accessible to the implement of the robot 12. During the time the robot 12 is in operation a new workpiece 16 is mounted between the two other fixture supporting plates 42a' and 42b'.

When the operation of the robot 12 on the first workpiece 16 is finished, the workpiece holder 22a' is rotated approximately half a revolution by means of the drive mechanism 32 in the opposite direction. The newly mounted workpiece being thus moved into the operative position within the operating range of the robot whereas the completed workpiece is moved to the loading position and may be detached in order to be replaced by a further new workpiece.

While the form of apparatus herein described constitutes a preferred embodiment of this invention, it is to be understood that the invention is not limited to this precise form of apparatus, and that changes which include modifications, derivations and improvements may be made therein without departing from the scope of the invention which is defined in the appended claims.

What is claimed is:

1. A workpiece positioner, which includes:
   a pair of generally vertical disposed laterally displaced and opposing workpiece holder supports; and
   a pair of workpiece holders operably connected to said workpiece holder supports, said pair of workpiece holders including a first set of workpiece holders and a second set of workpiece holders, wherein each said set of workpiece holders includes a first workpiece holder and second workpiece holder which are operably associated with one of said workpiece holder supports such that sad first workspace holder are opposing and generally coaxially aligned with said respective second workpiece holders and said workpiece holders rotate about a first generally horizontal common as with respect to said vertical workpiece holder supports, further said first set of workpiece holders are rotatably driven about a second common axis and said second set of workpiece holders are rotatably driven about a third common axis which when said first and said second set of workpiece holders are in an operating position are disposed at least partially on an opposite side of a plane which runs generally perpendicular to said vertical workpiece holder support and through said horizontal common axis.

2. The workpiece positioner of claim 1, wherein said workpiece holders are interconnected by a support tying member which is configured to provide a minimal clearance region between two workpieces operably disposed on and between said workpiece holders, wherein said support tying member runs through said first generally horizontal axis has a first portion forming an acute angle with respect to said horizontal plane and a second portion forming an obtuse angle with respect to said horizontal plane.

3. The workpiece positioner of claim 2, wherein said support tying member is further characterized to extend through said minimal clearance region in a manner to serve as a shield between workpieces.

4. The workpiece positioner of claim 1, which further includes workpiece holder drive means for selectively rotating at least one said workpiece holder in each said set and independently rotating each workpiece about said second common axis and said third common axis.

5. A workpiece positioner for use with an associated robot, which includes:
   a pair of generally vertical disposed laterally displaced and opposing workpiece holder supports; and
   a pair of workpiece holders operably connected to said workpiece holder supports, said pair of workpiece holders including a first set of workpiece holders and a second set of workpiece holders, wherein each said set of workpiece holders includes a first workpiece holder and second workpiece holder which are operably associated with one of said workpiece holder supports such that said first workpiece holders are opposing and generally coaxially aligned with said respective second workpiece holders and said workpiece holders rotate about a first generally horizontal common axis with respect to said vertical workpiece holder supports, further said first set of workpiece holders are rotatably driven about a second common axis and said second set of workpiece holders are rotatably driven about a third common axis and which when said first and said second set of workpiece holders are in an operating position are disposed at least partially on an opposite side of a plane which runs generally perpendicular to said vertical workpiece holder support and through said horizontal common axis, wherein when said workpiece positioner is disposed adjacent the robot, said first workpiece holders and said second workpiece holders rotate in a manner such that at least one said first workpiece holders and said second workpiece holders occupies a loading position below said plane while said other of said first workpiece holders and said second workpiece holders occupies an work position adjacent the robot above said plane.

6. The workpiece positioner of claim 5, wherein said workpiece holders are interconnected by a support tying member which is configured to provide a minimal clearance region between two workpieces operably disposed on and between said workpiece holders, wherein said support tying member runs through said first generally horizontal axis has a first portion forming an acute angle with respect to said horizontal plane and a second portion forming an obtuse angle with respect to said horizontal plane.

7. The workpiece positioner of claim 6, wherein said support tying member is further characterized to extend through said minimal clearance region in a manner to serve as a shield between workpieces.

8. The workpiece positioner of claim 5, which further includes workpiece holder drive means for selectively rotating at least one said workpiece holder in each said set and independently rotating each workpiece about said second common axis and said third common axis.

* * * * *